US012794703B2

(12) United States Patent
Witoff et al.

(10) Patent No.: US 12,794,703 B2
(45) Date of Patent: Nov. 10, 2026

(54) MULTISIGNATURE VERIFICATION FOR DECENTRALIZED NETWORK OPERATIONS

(71) Applicant: Unit 410, LLC, San Antonio, TX (US)

(72) Inventors: Robert Witoff, San Antonio, TX (US); Drew Rothstein, San Antonio, TX (US); Joseph Langas, San Antonio, TX (US); Grant Slape, San Antonio, TX (US); Daniel Maclean, San Antonio, TX (US); Mohammad Syed, San Antonio, TX (US)

(73) Assignee: Unit 410, LLC, San Antonio, TX (US)

( * ) Notice: Subject to any disclaimer, the term of this patent is extended or adjusted under 35 U.S.C. 154(b) by 146 days.

(21) Appl. No.: 18/626,068

(22) Filed: Apr. 3, 2024

(65) Prior Publication Data

US 2025/0317302 A1 Oct. 9, 2025

(51) Int. Cl.

*H04W 12/121* (2021.01)
*H04L 9/08* (2006.01)
*H04L 9/32* (2006.01)

(52) U.S. Cl.

CPC .......... *H04L 9/3247* (2013.01); *H04L 9/0825* (2013.01)

(58) Field of Classification Search

None

See application file for complete search history.

(56) References Cited

U.S. PATENT DOCUMENTS

| | | | | |
|---|---|---|---|---|
| 12,034,865 | B2 * | 7/2024 | Trevethan | H04L 9/085 |
| 2015/0317487 | A1 * | 11/2015 | O'Hare | H04L 9/3231 713/189 |
| 2017/0109955 | A1 * | 4/2017 | Ernest | G07C 13/00 |
| 2020/0028675 | A1 * | 1/2020 | Gancarz | G06Q 20/3829 |
| 2022/0413874 | A1 * | 12/2022 | Awadallah | G06F 8/30 |
| 2023/0038529 | A1 * | 2/2023 | Gutta | G06F 16/3344 |
| 2024/0020116 | A1 * | 1/2024 | Chen | G06N 3/08 |

* cited by examiner

*Primary Examiner* — Jeffrey C Pwu
*Assistant Examiner* — Mayasa A. Shaawat
(74) *Attorney, Agent, or Firm* — Foley & Lardner LLP

(57) ABSTRACT

In certain embodiments, multisignature-based network operations are performed. Some embodiments may generate transformed instructions for a network operation and a set of sent messages based on an instruction precursor and obtain a set of signed messages corresponding to a set of sent messages. In connection with cryptographic verification of the set of signed messages, some embodiments cause the execution of the network operation based on the cryptographic verification satisfying a threshold number of valid signatures.

19 Claims, 5 Drawing Sheets

200

MULTISIGNATURE VERIFICATION FOR DECENTRALIZED NETWORK OPERATIONS

SUMMARY

Methods and systems are described herein for improvements to multisignature operations in blockchain networks. Various types of blockchain operations on a blockchain network may incorporate multisignature operations to require the approvals of multiple parties before performing a future network operation. Although such multisignature operations will generally require that a signing party use their signing key to sign programming code corresponding to a network operation to approve the network operation, the signing party is typically not required to prove that they saw a comprehensible representation of the network operation. Such network operations are frequently tied to distributed scripts or components of a broader distributed application, encompassing a range of activities from transactions and voting to significant state alterations. In traditional scenarios, a multisignature operation may incorporate a face-to-face meeting, telephonic meeting, or video meeting to verify a document, validate the identity of a signing party, and verify that they understand what operations they are approving. While thorough, such practices are time-consuming, still susceptible to malicious behavior, and difficult to scale in a decentralized network.

To overcome these technical deficiencies in preexisting systems, methods and systems disclosed herein facilitate multisignature operations, for example, based on a signature related to a natural language representation of a network operation. Some embodiments may generate instructions for an application programming interface (API) request or another set of transformed instructions for a set of network operations by providing a first instruction transformation model with an instruction precursor. Some embodiments may then generate natural language text used for different user-facing messages by providing a second instruction transformation model with the same instruction precursor. Some embodiments may then send the different user-facing messages to different users (e.g., send a first message that includes the natural language text to a first user and a second message that includes the natural language text to a second user). In connection with sending the set of messages, some embodiments may obtain a set of signed messages from the different users, where one or more of the signed messages include the contents of the sent message (e.g., the natural language text). Some embodiments may then rely on an airgap device to perform cryptographic verification of the multiple signed messages from different users (e.g., via a type of public-private key encryption algorithm). Alternatively, some embodiments may use a networked computer system to perform cryptographic verification. Some embodiments may then effectuate the set of network operations after determining that a threshold number of signed messages have been cryptographically verified. By using operations described in this disclosure, some embodiments may increase the security of multisignature network operations by increasing the likelihood that an authorized party has read and understood the operations they had agreed to by providing a digital signature.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details, or with an equivalent arrangement. In other cases, well-known structures and devices are shown in block diagram form in order to avoid unnecessarily obscuring the embodiments of the invention.

Figure 1:
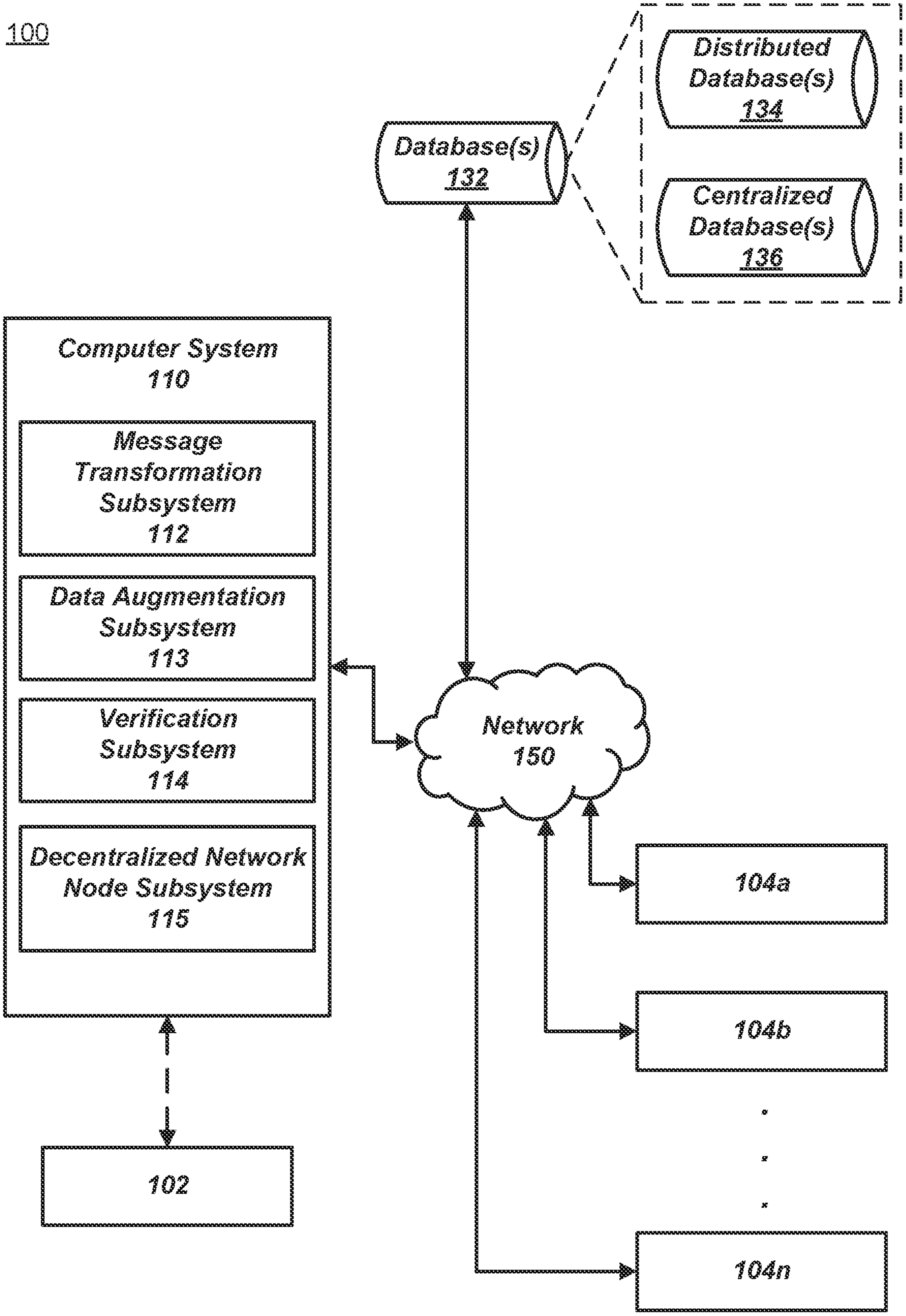
FIG. 1 shows a system for facilitating multisignature network operations, in accordance with one or more embodiments.

FIG. 1 shows a system 100 for facilitating multisignature network operations, in accordance with one or more embodiments. As shown in FIG. 1, system 100 may include computer system 110, a set of client devices 104 (client devices 104*a*-104*n*), or other components. Computer system 110 may include message transformation subsystem 112, data augmentation subsystem 113, verification subsystem 114, decentralized network node subsystem 115, or other components. Each client device of the client devices 104*a*-104*n* may include any type of mobile terminal, fixed terminal, or other device. By way of example, client device 104*a* may include a desktop computer, a mobile computing device (e.g., a laptop computer, a tablet computer, a smartphone, a wearable computing device), or other client device. Users may, for instance, utilize one or more client devices 104*a*-104*n* to interact with one another, one or more servers, or other components of system 100. Furthermore, data from the set of client devices 104 or the computer system 110 may be provided via non-networking means (e.g., a universal serial bus (USB) drive, a quick-response (QR) code, manual data entry, etc.) to an airgap device 102. The airgap device 102 may be used to perform cryptographic verification, execute transactions, or perform other operations connected to obtaining a cryptographically signed message.

It should be noted that, while one or more operations are described herein as being performed by particular components of computer system 110, those operations may, in some embodiments, be performed by other components of computer system 110 or other components of system 100. As an example, while one or more operations are described herein as being performed by components of computer system 110, those operations may, in some embodiments, be performed by one or more components of the set of client devices 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

As discussed, although multisignature operations play an important role in various distributed network operations, preexisting multisignature operations can be cumbersome and require significant real-time human interaction. While video calls and in-person meetings provide gold-standard verification, such operations rely on some degree of user sophistication and do not actually provide immutable evidence that a signing user understands the steps of a network operation. Moreover, video calls and in-person meetings for real-time verification are especially troublesome when airgap devices are used to effectuate a blockchain transaction or other type of network transaction because such devices are inherently isolated from a network.

In some embodiments, the system 100 may initiate or cause a network operation requiring permission from one or more parties based on one or more signed messages related to natural language text. Some embodiments may obtain an instruction precursor and generate both the natural language text and an API request (another type of transformed instruction) using one or more models (e.g., one or more transformation models). The signed messages provided by an authorized user may include the natural language text or other content sent to the user indicating what the user had agreed to. By using the instruction precursor as the basis for both message verification (via inclusion of the natural language text in the signed messages) and API request generation, the system 100 can increase the likelihood that an authorized network operation is occurring with the actual knowledge of the authorizing parties.

In some embodiments, the system 100 may perform multisignature-required network operations by generating natural language text based on an instruction precursor and sending a set of messages that includes the natural language text to a set of users. In connection with the sent messages, the system 100 may obtain signed messages from client devices of the different users. In some embodiments, the different signed messages may include the natural language text to indicate what text the signing party had reviewed. For example, a first user may send, via a first user device, a first key-shard-signed message that includes a first message to indicate that the user had signed on a first message. The system 100 may convert the first message into an API request interpretable by a computer system to execute a corresponding network operation based on the API request. In the case of multisignature operations, the system 100 may obtain multiple key-shard-signed messages and convert the instructions in each key-shard-signed message to an API request. After verifying that the generated API requests match each other, the system 100 may then execute the network operation using the generated API request.

In many cases, transaction security for a network operation on a network may benefit from the use of the airgap device 102. The airgap device 102 is isolated from the network and, in many cases, is isolated from all networks such that it can only be communicated with via local means (e.g., an attached USB device). The system 100 may provide the airgap device 102 with the signed messages provided by users to execute a transaction or distributed script operation before transferring the transaction data or distributed script operation to a node of a blockchain network for further operation. In some embodiments, the airgap device 102 may cryptographically verify the signed messages. Cryptographic verification by the airgap device or another computing device may include determining whether the signed messages are signed by the appropriate authorizing entities or devices and whether the natural language messages conveyed in the signed messages accurately reflect an intended operation. For example, in some embodiments, the airgap device 102 may receive set of public keys for verification of a digital signature of first and second users received as a part of a pair of signed messages to verify that both parties have signed. The airgap device 102 may compare a first natural text message in the first signed message and a second natural text message in the second signed message to verify that the natural language text in the two messages match. Alternatively, or additionally, the airgap device 102 may provide a first natural text message in the first signed message and a second natural text message in the second signed message to a transformation model to verify that the output instructions generated by the transformation model match. The airgap device 102 may then perform a signed transaction operation based on the provided data and provide the signed transaction to a blockchain node for execution of a network operation based on the signed transaction (e.g., broadcasting the signed transaction to the nodes of a blockchain network).

In some embodiments, the use of a shared instruction precursor to generate messages for cryptographic verification and generate API requests (or other machine-interpretable transformed instructions) provides a more secure means of executing network operations designed to require the authorization of multiple parties. For example, some embodiments may execute a transaction based on the results of a cryptographic verification satisfying one or more criteria, where such criteria may include a criterion that the threshold number of valid signatures approving the transaction has been satisfied. After satisfying such criteria, some embodiments may then effectuate a set of network operations based on a generated API request. Such operations can increase the likelihood that a signing party has provided informed consent to the set of network operations they were agreeing to authorize while preventing unnecessary holdups to party authorization.

Subsystems 112-115

In some embodiments, a message transformation subsystem 112 may generate a set of transformed instructions and a set of natural language messages based on an instruction precursor. The message transformation subsystem 112 may use an instruction transformation model to generate a set of instructions used to execute a set of network operations. In some embodiments, the message transformation subsystem 112 may use a rule-based instruction transformation method. After receiving an instruction precursor, the message transformation subsystem 112 may segment the first message into a sequence of values by using a set of character sequences as delimiters. For example, the message transformation subsystem 112 may obtain an instruction precursor that includes the text sequence "first user to send XYZ resources to second user." The message transformation subsystem 112 may then obtain a list of keywords that includes the words "send" and "to" and parse the text sequence to a list of values that includes "first user," "send," "XYZ" and "second user."

The message transformation subsystem 112 may then use a script template to generate a new set of instructions based on the list of values. For example, the message transformation subsystem 112 may generate the network script instruction "firsUWall.send_to(U2, XYZ)." As described elsewhere, some embodiments may then use the transformed instruction provided by the instruction transformation model to cause one or more network operations to execute (e.g., by generating a signed transaction and then sending the signed transaction to a blockchain network). Furthermore, an instruction precursor may include program code or another type of machine-interpretable instruction, where an output transformed instruction generated by the message transformation subsystem 112 may include the program code or other type of machine-interpretable instruction.

The message transformation subsystem 112 may use one of various types of instruction transformation models, such as a template-based instruction transformation model, a neural network model, etc. For example, the message transformation subsystem 112 may use a data table that maps words or phrases in an instruction precursor to words or phrases for an API message, script written in a programming language, or other machine-interpretable instruction. Alternatively, or additionally, the message transformation subsystem 112 may use a transformer-based neural network model that is trained to output a set of instructions for a blockchain network. Additionally, some embodiments may use different neural network models or change parameters of a neural network model when being used to generate instructions for a specific protocol or framework. For example, some embodiments may use a first neural network to output a natural language text into a first set of instructions interpretable with the Substrate blockchain framework and into a second set of instructions interpretable with the Ethereum blockchain framework.

Some embodiments may select different instruction transformation models or different parameters for an instruction transformation model based on a target network or target network platform. For example, some embodiments may obtain instructions to transform an instruction precursor into a format interpretable by a decentralized network platform that is identified by the decentralized network identifier "Ethereum." In response, the message transformation subsystem 112 may select an instruction transformation model associated with the decentralized network identifier "Ethereum" in lieu of other instruction transformation models available to the message transformation subsystem 112. In some embodiments, a decentralized network identifier may be selected by default such that obtaining an instruction precursor that is not associated with a specified decentralized network identifier will cause the message transformation subsystem 112 to select a default instruction transformation model.

In some embodiments, the message transformation subsystem 112 may generate a set of natural language messages based on the instruction precursor, where the set of natural language messages may be sent or otherwise communicated to users. In connection with sending messages, the message transformation subsystem 112 may generate natural language messages that are human-interpretable by providing an instruction transformer model with an instruction template. For example, some embodiments may use an instruction transformer model to transform an unexecuted set of instructions being used as an instruction template into a human-interpretable natural language format. In some embodiments, the unexecuted set of instructions may be written in a blockchain-adapted programming language (e.g., Solidity, Vyper, or another programming language run on the Ethereum Virtual Machine, a language used in Hyperledger Fabric, etc.). Alternatively, or additionally, instructions for a transaction or other network operation may be provided in the form of a set of instructions or collection parameters (e.g., a JSON document) that is transformed by an instruction transformation model into a form that is interpretable to an underlying blockchain protocol. Some embodiments may use a template-based method to generate a natural language message based on an instruction precursor. For example, some embodiments may detect that a set of instructions indicates a transfer and, in response, use a template-based message transformation generation model to fill the fields "SENDER," "AMOUNT," and "RECEIVER" of the phrase "[[SENDER]] will send [[AMOUNT]] to [[RECEIVER]]" to generate a message.

While the above example describes the use of a template-based message generation model, some embodiments may use generative neural network models for message generation. For example, some embodiments may use a generative neural network model to convert a set of instructions written in Solidity into human-interpretable natural language text. Furthermore, the message transformation subsystem 112 can be configured to provide different messages to different users based on the different user's roles with respect to instructions for an intended blockchain transaction or other network operation. In some embodiments, the message transformation subsystem 112 may account for message recipient identity when determining identifiers used in a natural language message. For example, the message transformation subsystem 112 may be provided with an instruction precursor that recites an unexecuted set of instructions to transfer 12 resource units from a first user to a second user in three days. The message transformation subsystem 112 may then (i) generate and send a first message to the first user stating, "you will allocate 12 resource units to 'Second User' in three days" and further (ii) generate and send a second message to the second user stating, "you will be provided with 12 resource units from 'First User' in three days." Despite being different from each other, the first and second messages may correspond to a same request for a network operation.

In some embodiments, an instruction transformation model used to generate a machine-interpretable message may be architecturally similar to an instruction transformation model used to generate a natural language message. For example, the message transformation subsystem 112 may use a template-based instruction transformation model to transform an instruction precursor into natural language text and use another template-based instruction transformation model to generate a machine-interpretable set of instructions based on the same instruction precursor. Alternatively, an instruction transformation model used to generate a machine-interpretable message may be architecturally different from the instruction transformation model used to generate a natural language message.

In some embodiments, the message transformation subsystem 112 may use the output of a data augmentation subsystem 113 to provide additional information useful for a user to evaluate a proposed set of operations, such as by providing values related to the likelihood or failure of an event. For example, the data augmentation subsystem 113 may detect that a portion of an instruction precursor or a generated message indicates a condition that must be satisfied for a transaction to occur. Some embodiments may detect an event based on detecting a keyword (e.g., the presence of "if," "while," "else if," or "then,"), detecting an explicitly defined condition (e.g., a list of parameters explicitly defines a conditional statement), etc. In connection with detecting this event, some embodiments may then use a heuristic model based on this detected event to provide a probability representing a likelihood that an event satisfying the condition will occur. For example, a heuristic model may evaluate the likelihood of an event satisfying a condition in a proposed set of network operations by first determining a count for all times that the condition of that type was proposed (e.g., a "transfer" event by a required party) and then determining a count of times that the condition was fulfilled. Some embodiments may then send the failure likelihood in conjunction with a message generated by the message transformation subsystem 112 to a user device.

In some embodiments, the data augmentation subsystem 113 may apply a risk heuristic model to a message or a set of network operations performed based on the message. The output of the risk heuristic model may provide users with a quantitative summary or metric of what may be a complex set of conditions and outcomes. In some embodiments, the risks associated with multiple events indicated by natural language text may be combined to determine a combined risk score. For example, a set of network operation instructions generated from an instruction precursor may indicate a series of quantitative changes (e.g., a series of transactions), some of which occur without the satisfaction of additional conditions and some of which do require at least one additional condition be satisfied. The data augmentation subsystem 113 may then determine, based on a sum of quantities related to the events (e.g., a sum based on incoming and outgoing transactions), a score associated with the message. For example, the data augmentation subsystem 113 may detect a first transfer event and second transfer event from the message "user1 sends 30 resource units to user2 and receives 20 resource units from user9" based on the keywords "send" and "receive." The data augmentation subsystem 113 may then determine the first and second transfer events to be associated with the values "−30" and "20" and, in response, sum the associated values to determine a score "−10." Some embodiments may then send the message and the score to the user device for the user "user1."

Alternatively, or additionally, other metrics may be provided, such as an extremum value (e.g., a maximum value or minimum value) of the set of quantities. For example, some embodiments may determine that a set of events includes quantitative score changes represented by the set of numeric values "[20, 10, 50]." The data augmentation subsystem 113 may then determine "50" as the maximum value and "10" as the minimum value of the set of numeric values. When sending a message generated by the message transformation subsystem 112 to a user device, some embodiments may also send the set of extrema of the set of numeric values to the user device. By transmitting extrema in conjunction with other messages, some embodiments may provide an estimate of a maximum gain or loss with respect to operations indicated by a message.

Some embodiments may access a history of previous events to determine likelihoods of events occurrence (a "plurality of likelihoods"). Some embodiments may then determine a score based on the plurality of likelihoods and their corresponding transaction amounts or other corresponding quantitative values. For example, the data augmentation subsystem 113 may detect a set of events indicated in the unexecuted instructions and determine or otherwise obtain a set of likelihoods for the set of events using operations described in this disclosure. The data augmentation subsystem 113 may then use the set of likelihoods and their associated quantitative values to determine an expectation value associated with the message (e.g., by determining a dot product of the set of likelihoods and the associated set of quantitative values). Some embodiments may then use the expectation value as a score or determine a score based on the expectation value (e.g., setting the score to a particular value if the expectation value is greater than an expectation value threshold).

As described elsewhere in this disclosure, some embodiments may compute and then provide a score based on or indicating a likelihood, extremum value, probability, expectation value, or other values useful for a user to understand the quantitative impact of a message. Some embodiments may further consider a user's own history or an aggregated history of multiple users when determining a score. For example, after generating a first message based on an unexecuted set of instructions (or other type of instruction precursor), some embodiments may then determine a set of event types associated with the first message or the unexecuted set of instructions. The set of event types may represent events associated with an entity successfully satisfying a condition, an entity having an agreed-upon amount at a particular time, an entity delivering or allocating a resource of specified type, etc. Some embodiments may detect a set of events and associated set of event types by providing the first message to a machine learning model that is trained to detect events. Alternatively, or additionally, some embodiments may detect a set of events based on an event precursor used to generate a sent message, where the unexecuted set of instructions may directly indicate events and their associated event types. Some embodiments may then determine a score based on a set of numeric values indicated by the detected set of events (e.g., by determining a sum, determining an extremum, determining an expectation value, etc.). Some embodiments may then modify the score sent to a user based on a user history associated with the user. For example, some embodiments may generate an initial score indicating that a transaction is high risk based on a computed numeric value (e.g., a sum or a maximum) being greater than a warning threshold. Some embodiments may then reduce the initial score based on a determination that the user had performed numerous transactions involving the numeric value or values greater than the numeric value. By taking a user's past history into account, some embodiments may reduce the likelihood of sending too many warnings to a user for transactions with which a user should be familiar.

In some embodiments, the data augmentation subsystem 113 may use a data table or other collection of data that maps terms of a natural language message with a set of text definitions or related text information for those terms. For example, after detecting the phrase "send" in a natural language message being sent to a first user, the data augmentation subsystem 113 may retrieve a text definition for "send" in the context of a predetermined blockchain protocol. The data augmentation subsystem 113 may then provide the text to the first user. By providing definitions, explanations, and other text information, some embodiments may facilitate greater understanding of a sent message.

In some embodiments, a verification subsystem 114 may verify that a set of criteria associated with verification is satisfied. As described elsewhere, some embodiments may perform verification operations without relying on the airgap device 102. For example, some embodiments may use a computing node of a blockchain network to cryptographically verify a set of messages and then execute network operations in response to the verification. Alternatively, the verification subsystem 114 may rely at least in part on cryptographic verifications performed by an airgap device to execute network operations.

In some embodiments, the airgap device 102 may be provided with parameters of the verification subsystem 114 to perform cryptographic verification. For example, the verification subsystem 114 (or some other component of the system 100) may provide the airgap device 102 with instructions to cryptographically verify signed messages. Various means of cryptographic verification may be performed by the computer system 110 or the airgap device 102. For example, the airgap device 102 may be provided with the public keys of a first and second user. The airgap device 102 may then be provided with a set of signed messages and use public key cryptography to verify some or all of the signed messages based on received keys. For example, the airgap device 102 may parse a signed message into a digital signature and message content data. The digital signature may represent an identity of the signing party, and the message content data (e.g., message text, image, or other message data) may be provided in the signed message to represent reviewed and approved content. The airgap device 102 may use the public key corresponding with the first user to verify the digital signature to confirm that it was the first user who had actually signed the message. For example, a user device may use an Elliptic Curve Digital Signature Algorithm (ECDSA) to sign a message with a digital signature based on a private key. The verification subsystem 114 or an airgap device may then be provided with the signed message and verify the signed message with the public key using an ECDSA verification process.

The airgap device 102 may also use the message data to generate a key to determine whether the generated key matches with other keys generated from other signed messages. For example, the airgap device 102 may obtain a first signed message from a first user via the client device **104*a* and a second signed message from a second user via the client device 104*b*. The airgap device 102 may then parse the first signed message into a first digital signature and a first message text and parse the second signed message into a second digital signature and a second message text. The airgap device 102 may have received the public keys corresponding with the first and second users and verify the identities of the first and second users via public key cryptography techniques using the first and second public keys. In some embodiments, the airgap device 102 may determine whether the set of instructions are identical based on a match between the generated set of instructions or the series of values. For example, the airgap device 102 may generate a first set of values "[10, −12, 38]" based on a first signed message and generate a second set of values "[10, −12, 38]" based on a second signed message. The airgap device 102 may then determine (i) that both the first and second sets of values are identical and (ii) that the first and second digital signatures of the first and second signed messages are verified (e.g., based on private-public key verification). In response to this determination, the airgap device 102 may then determine that the first and second signed messages are cryptographically verified. The airgap device 102 may perform similar operations for other incoming signed messages and may also provide a count of the total number of signed messages that are cryptographically verified. Additionally, it should be understood that, in some embodiments, the airgap device 102 may perform cryptographic verification with respect to digital signatures of a signed message without further testing text content in the signed message. Furthermore, it should be understood that, while some embodiments may use the airgap device 102, some embodiments may use a network-connected device such as the computer system 110 to perform operations described as being performed by the airgap device 102**.

Some embodiments may use the computer system 110 to verify that the signed message sent by the client device **104*a* indicates that the client device 104*a* was the source of the signed message and that a target user's user account was used to generate the signed message. For example, the computer system 110 may send a first message to the set of client devices 104 and a second message to the client device 104*b*. In some embodiments, the system 100 may associate the first message with a first expected device identifier and a first expected user identifier. Similarly, the system 100 may associate the second message with a second expected device identifier and a second expected user identifier. Some embodiments may then obtain a first signed message associated with the first message and a second signed message associated with the second message. Some embodiments may then decrypt some or all of a first signed message provided by the client device 104*a* to obtain a device identifier identifying the client device 104*a* and to obtain a user identifier indicating a target user. Based on a determination that the device identifier matches the first expected device identifier and a determination that the user identifier matches the first expected user identifier, some embodiments may verify the first signed message. Some embodiments may perform similar operations to verify that a second signed message was sent by the client device 104*b*. For example, the verification subsystem 114 may verify the second signed message based on a determination that a device identifier of the second signed message matches the second expected device identifier and that the user identifier of the second signed message matches the second expected user identifier. Furthermore, a user may select a new device that should be sent a message used for cryptographic verification or validation, where the computer system 110 may then update an expected device identifier to reflect the newly selected device. For example, after sending a first message to the client device 104*a*, some embodiments may receive instructions to resend the first message to the client device 104*n*. In response, the computer system 110 may update an expected device identifier to reflect the identity of the client device 104*n***.

In connection with the cryptographic verification performed by the airgap device 102, the computer system 110, or another computing system, the computer system 110 may execute a set of network operations based on a transformed instruction. For example, the computer system 110 may use the message transformation subsystem 112 to generate a set of transformed instructions in the form of API requests. Some embodiments may then effectuate network operations, such as operations to change a smart contract or distributed application state, change a set of blockchain ledger values, broadcast a signed transaction, etc.

Further in connection with the cryptographic verification, the verification subsystem 114 may determine whether a threshold number of valid signatures is satisfied or another set of criteria related to the signed messages is satisfied. In some embodiments, the verification subsystem 114 may require that a majority of authorized parties provide a verifiable signed message, and thus the corresponding threshold number of valid signatures would be less than a count of all of the authorized parties. For example, the message transformation subsystem 112 may generate five different messages to be sent to five different users indicated as authorized parties. The computer system 110 may then receive three signed messages and either directly cryptographically verify the three signed messages or receive a confirmation of cryptographic verification from the airgap device 102, where the airgap device 102 may indicate that the three signed messages are cryptographically verified. The verification subsystem 114 may then determine that the threshold number of valid signatures required for a majority of authorized parties (i.e., three of five signed messages) is satisfied by the cryptographic verification. Alternatively, the verification subsystem 114 may require that all authorized parties provide signed messages that can be verified using cryptographic verification techniques. For example, the message transformation subsystem 112 may generate five different messages to be sent to five different users indicated as authorized parties. The computer system 110 may then receive three signed messages that are cryptographically verified by the airgap device 102. The verification subsystem 114 may then determine that the threshold number of valid signatures required (i.e., five signed messages, one from each of the five authorized parties) is not satisfied by the cryptographic verification and wait until receiving and verifying the two remaining signed messages.

In some embodiments, a decentralized network node subsystem 115 may cause the execution of one or more network operations based on a transformed instruction generated by the message transformation subsystem 112 or another set of machine-interpretable instructions. The decentralized network node subsystem 115 may act as a node for or otherwise interact with a decentralized network, such as a blockchain network. Some embodiments may use the message transformation subsystem 112 to generate an API request or another transformed instruction based on the content of a signed message provided by a user. After obtaining a confirmation that a set of signed messages is verified and satisfies any additional criteria, some embodiments use the decentralized network node subsystem 115 to submit the API request to a decentralized network supported by the decentralized network node subsystem 115. The API request may then cause a set of network operations to execute on the decentralized network, where such operations may include a transaction, a broadcast of a transaction, a change in a state of a distributed script or distributed application, etc. In some embodiments, the additional criteria may include a criterion that the cryptographic verification satisfies a threshold number of valid signatures.

Figure 2:
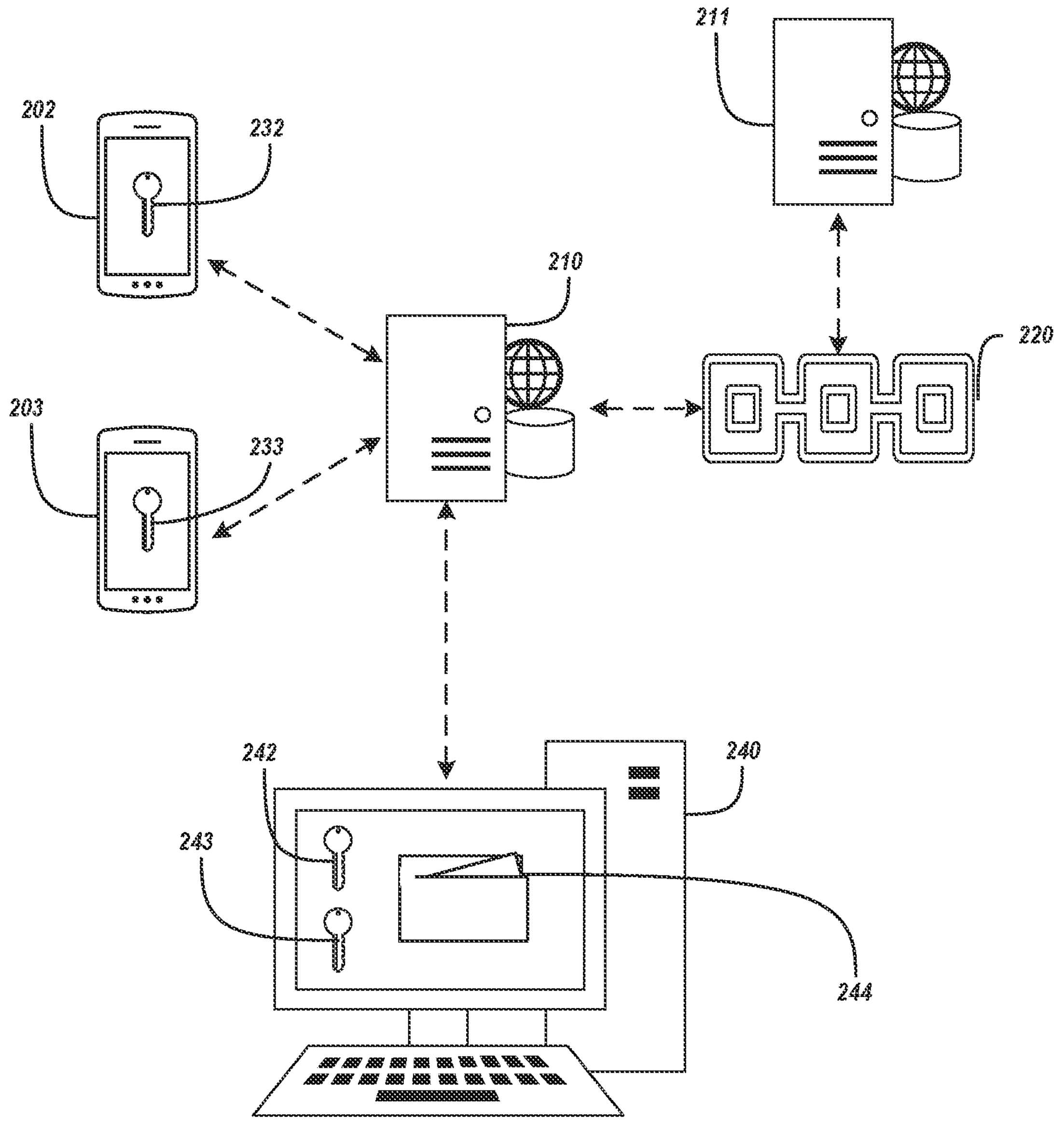
FIG. 2 shows an illustrative diagram for conducting multisignature operations and other network operations for a blockchain network, in accordance with one or more embodiments.

FIG. 2 shows an illustrative diagram for conducting multisignature operations and other network operations for a blockchain network, in accordance with one or more embodiments. A system 200 includes a user device 202 and a user device 203, each of which may include a respective user interface. As referred to herein, a "user interface" may include a mechanism for human-computer interaction and communication in a device and may include display screens, keyboards, a mouse, and the appearance of a desktop. For example, a user interface may include a way a user interacts with an application or website in order to review a received message, sign the message with a digital signature, and cause the transmission of the signed message back to a server.

The system 200 may include multiple user devices used as nodes of a blockchain network used to store and update the blockchain 220 (e.g., user device 210 and user device 211). For example, system 200 may include a distributed state machine, in which some of the components in FIG. 2 act as a client of system 200 and may be used as nodes of a blockchain 220. For example, system 200 (as well as other systems described herein) may include a large data structure that holds not only all accounts and balances but also a machine state, which can change from block to block according to a predefined set of rules, and which can execute arbitrary machine code. The specific rules of changing state from block to block may be maintained by a virtual machine (e.g., a computer file implemented on or accessible by a user device, which behaves like an actual computer) for the system.

While shown as smartphones (e.g., user device 202 and user device 203), a personal computer (e.g., airgap device 240), and servers (e.g., user device 210 and user device 211), respectively, in FIG. 2, it should be noted that user devices may be any computing device, including, but not limited to, a laptop computer, a tablet computer, a hand-held computer, or other computing equipment (e.g., a server), including "smart," wireless, wearable, or mobile devices. It should be noted that embodiments describing system 200 performing a blockchain operation may equally be applied to, and correspond to, an individual user device (e.g., user device 210 or user device 211) performing the blockchain operation. That is, system 200 may correspond to the user devices (e.g., user device 210 or user device 211) collectively or individually. Furthermore, while shown as not being directly connected to a blockchain 220, other embodiments may include the blockchain networks that include mobile computing devices in their network of nodes.

The system 200 may, via computer devices such as the user device 210, perform blockchain operations or other network operations based on successful multisignature verifications. As referred to herein, "blockchain operations" may include any network operations including or related to blockchain networks and blockchain technology. For example, blockchain operations may include conducting transactions, querying a distributed ledger, generating additional blocks for a blockchain, transmitting communications-related non-fungible tokens, performing encryption/decryption, exchanging public/private keys, or other operations related to blockchains and blockchain technology. In some embodiments, a blockchain operation may include the creation, modification, detection, or execution of a smart contract or program stored on a blockchain. A smart contract includes a distributed script stored on a blockchain that is executed (e.g., automatically without any intermediary's involvement or time loss) when one or more predetermined conditions are met. In some embodiments, a blockchain operation may include the creation, modification, exchange, or review of a token (e.g., a digital asset specific blockchain), including a non-fungible token. A non-fungible token may include a token that is associated with a good, service, smart contract, or other content that may be verified by, and stored using, blockchain technology.

In some embodiments, blockchain operations may also include actions related to mechanisms that facilitate other blockchain operations (e.g., actions related to metering activities for blockchain operations) on a given blockchain network. For example, Ethereum, which is an open source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed running the smart contract. The system may terminate execution of the smart contract if the amount of gas consumed by computation exceeds the gas available in the blockchain operation. For example, in Ethereum, gas includes a mechanism for allowing Turing-complete computation while limiting the resources that any smart contract or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas earmarked for a blockchain operation may be refunded back to the originator of the blockchain operation if, after the computation is executed, an amount remains unused. For example, the execution of a transaction or more complex set of operations (e.g., executing a smart contract) may include performing a network operation in the form of obtaining gas or other operations used to facilitate the transaction or more complex set of operations.

As shown in FIG. 2, one or more user devices may include a private key (e.g., a private key 232 stored on user device 202 or a private key 233 stored on user device 203) or digital signature derived from the private key. In some embodiments, the system 200 may use cryptographic systems for conducting blockchain operations, such as transmitting data to be stored on a blockchain, sending a data removal request to a smart contract, sending a verification request to a smart contract, etc. The system 200 may use public key cryptography, which features a pair of digital keys (e.g., which may include strings of data). In such cases, each pair includes a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may only be decrypted with the receiver's corresponding private key. In some embodiments, system 200 may combine a message with a private key to create a digital signature on the message. For example, the digital signature may be used to verify the authenticity of blockchain operations. For example, when conducting blockchain operations, system 200 may use the digital signature to prove to every node in the system that it is authorized to conduct the blockchain operations.

The system 200 may include a plurality of nodes for the blockchain network used to store or update the blockchain 220. Each node may correspond to a user device (e.g., user device 210 or user device 211). A node for a blockchain network may include an application or other software that records or monitors peer connections to other nodes or miners for the blockchain network. For example, a miner includes a node in a blockchain network that facilitates blockchain operations by verifying blockchain operations on the blockchain, adding new blocks to the existing chain, or ensuring that these additions are accurate. The nodes may continually record the state of the blockchain and respond to remote procedure requests for information about the blockchain. In some embodiments, these nodes can be used to cause a set of network operations on the blockchain network after obtaining cryptographic verification of a sufficient number of signed messages approving the set of network operations.

In some embodiments, the user device 210 may generate a first message that is sent to the user device 202 and a second message that is sent to the user device 203. A user operating the user device 202 may then read the first message and sign the message with a digital signature derived from the private key 232. Similarly, a user operating the user device 203 may then read the first message and sign the message with a digital signature derived from the private key 233. The user device 210 may transform the signed message from the user device 202 into a first transformed instruction (e.g., an API call). Similarly, the user device 210 may transform the signed message from the user device 203 into a second transformed instruction. The user device 210 may then send the API call to the appropriate API destination (e.g., a service endpoint, a smart contract interface, a decentralized application interface, a third-party blockchain API, etc.) to execute a set of associated blockchain operations or other network operations.

In some embodiments, the user device 210 may use results indicating cryptographic verification from an airgap device 240. In some embodiments, results indicating cryptographic verification may include a binary value confirming verification, data indicating an executed transaction, a number indicating a count of verified signed messages, or another set of values indicating cryptographic verification. For example, the user device 210 may transfer a set of signed messages to a USB device that is then transferred to the airgap device 240. Alternatively, other non-networking means of transferring data may be used (e.g., a QR code, direct data entry, a transferred hard drive, etc.). A user may further provide the airgap device 240 with a set of public keys (including a public key 242 and a public key 243) to validate digital signatures of the first and second signed messages.

In some embodiments, the airgap device 240 may, after confirming that a set of verification criteria is satisfied (e.g., a total number of cryptographically verified signed messages satisfies a threshold number of valid signatures), execute a signed transaction. For example, the airgap device 240 may cryptographically verify a pair of signed messages originating from the user device 202 and the user device 203 and further determine the threshold number of valid signatures is satisfied. The airgap device 240 may then use a wallet application 244 to sign a transaction or perform operations related to a smart contract. The wallet application 244 or other wallet applications may be used to perform blockchain operations. For example, the wallet application may include a repository that allows users to store, manage, and trade their cryptocurrencies and assets, interact with blockchains, or conduct blockchain operations using one or more applications. In cases where a computing device may be used to communicate with nodes of the blockchain 220 (e.g., a wallet application executing on the user device 210), a wallet application executing on the computing device may be used to directly update the blockchain 220 via the same computing device. In some embodiments, a wallet application may be specific to a given blockchain protocol or provide access to multiple blockchain protocols.

A user may use a non-networking process to retrieve the signed transaction or other operation data from the airgap device 240 and transfer the signed transaction or other operation data to the user device 210. The user device 210 may then cause one or more network operations based on the signed transaction or other operation data. For example, in the case that a signed transaction was transferred to the user device 210, the user device 210 may perform network operations to broadcast the signed transaction to other nodes of the blockchain network supporting the blockchain 220, such as the user device 211. Alternatively, or additionally, after receiving a cryptographic verification determined by the airgap device 240, the user device 210 may execute a set of API calls (e.g., API calls that are generated from an instruction precursor using an instruction transformation model). The user device 210 may further determine that the cryptographic verification indicates that the number of verified signed messages is equal to or greater than a threshold number of valid signatures. In response, the user device 210 may perform blockchain operations to send the generated API call to a blockchain service or other API destination, where receipt of such API calls may cause additional blockchain operations or other network operations. In some embodiments, such operations may include broadcasting a result (e.g., a signed transaction) originating at the user device 210, where each node of the blockchain 220 may perform operations to authenticate the blockchain operation.

Following an authentication of the blockchain operation, the blockchain operation may be authorized. For example, after the blockchain operation is authenticated between the users, system 200 may authorize the blockchain operation prior to adding it to the blockchain. For example, system 200 may add the blockchain operation to blockchain 220. The system 200 may perform this based on a consensus of the user devices within system 200. For example, system 200 may rely on a majority (or other metric) of the nodes in the community network (e.g., user device 202, user device 203, or user device 210) to determine that the blockchain operation is valid. In response to validation of the block, a node user device (e.g., user device 202, user device 203, or user device 210) in the community network (e.g., a miner) may receive a reward (e.g., in a given cryptocurrency) as an incentive for validating the block.

To validate the blockchain operation, system 300 may use one or more validation protocols or validation mechanisms. For example, system 300 may use a proof-of-work mechanism in which a user device must provide evidence that it performed computational work to validate a blockchain operation and thus provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively, or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to blockchain 220, and the blockchain operation is completed. For example, to add the blockchain operation to blockchain 220, the successful node (e.g., the successful miner) encapsulates the blockchain operation in a new block before transmitting the block throughout system 300.

Figure 3:
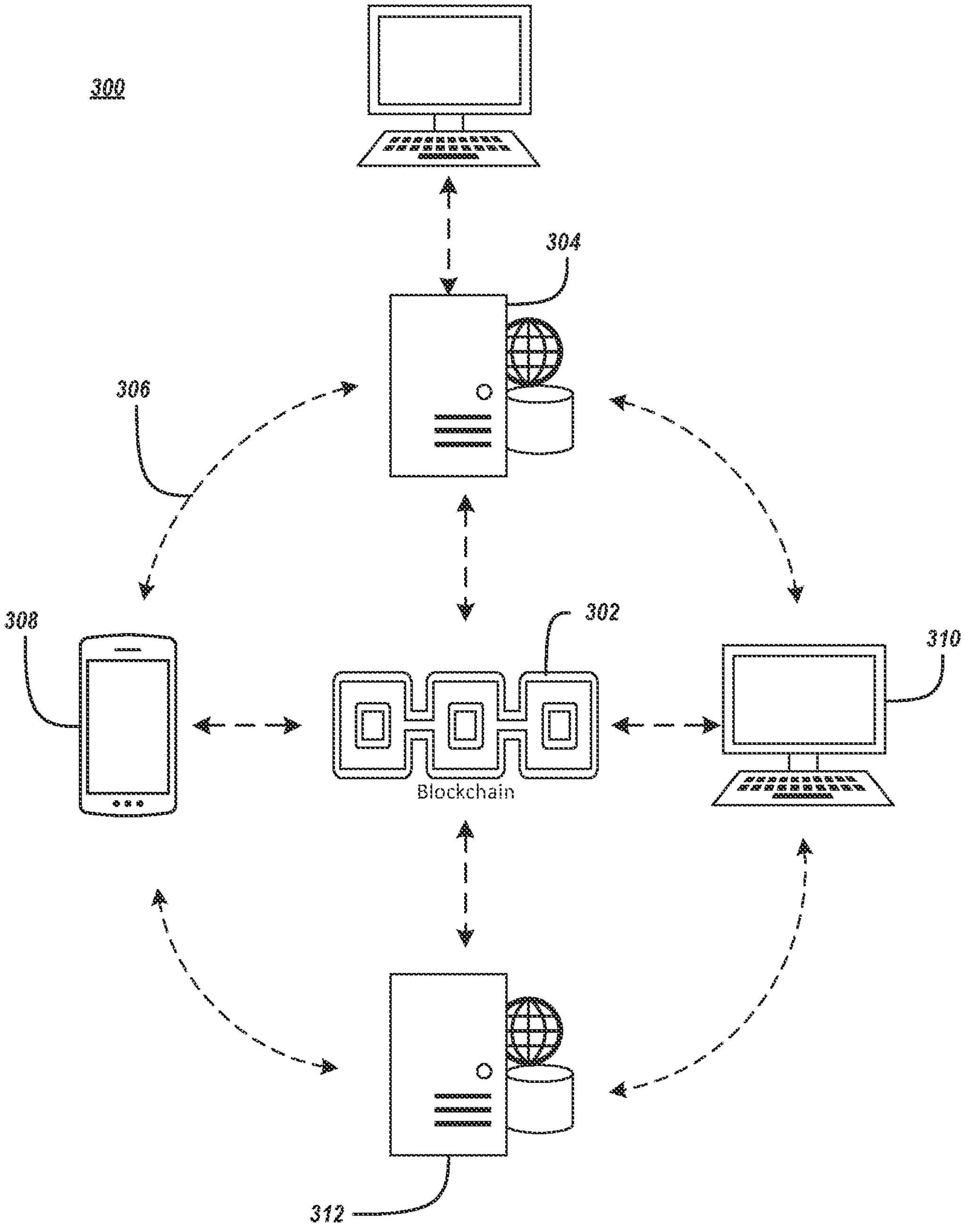
FIG. 3 shows an illustrative diagram for a decentralized application, in accordance with one or more embodiments.

FIG. 3 shows an illustrative diagram for a decentralized application, in accordance with one or more embodiments. For example, in some embodiments, the system may perform network operations based on multisignature verification, where the network operation may include operations within a decentralized application environment. For example, a decentralized application may include an application that exists on a blockchain (e.g., blockchain 302) or a peer-to-peer network (e.g., network 306). That is, a decentralized application may include an application that has a back end that is in part powered by a decentralized peer-to-peer network such as a decentralized, open source blockchain with distributed script functionality (e.g., smart contract functionality). For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network without the need of any intermediaries or central authorities. For example, the user device 304 may receive signed messages from other user devices and cause the execution of one or more network operations that update the blockchain 302.

In some embodiments, the user devices of system 300 may include one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that, while one or more operations (e.g., blockchain operations) are described herein as being performed by a particular component (e.g., user device 304) of system 300, those operations may, in some embodiments, be performed by other components of system 300. In some embodiments, the various computers and systems described herein may include one or more computing devices that are programmed to perform the described functions. Additionally, or alternatively, multiple users may interact with system 300 or one or more components of system 300. For example, in one embodiment, a first user and a second user may interact with system 300 using two different components (e.g., user device 304 and user device 308, respectively). Additionally, or alternatively, a single user (or a user account linked to a single user) may interact with system 300 or one or more components of system 300 using two different components (e.g., user device 304 and user device 308, respectively).

With respect to the components of system 300, each of these devices may receive content and data via input/output (I/O) paths using I/O circuitry. Each of these devices may also include processors or control circuitry to send and receive commands, requests, and other suitable data using the I/O paths. The control circuitry may include any suitable processing, storage, or I/O circuitry. Each of these devices may also include a user input interface or user output interface (e.g., a display) for use in receiving and displaying data. For example, as shown in FIG. 3, both the user device 308 and the user device 310 include a display upon which to display data (e.g., content related to one or more blockchain operations).

Additionally, the one or more devices in system 300 may run an application (or another suitable program). The application may cause the processors or control circuitry to perform operations related to message generation, instruction transformation, multisignature verification, or other operations described in this disclosure.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

The user devices 304, 308, 310, and 312 are connected to each other by a network 306, which may include communication paths between user devices. The communication paths may include the internet, a mobile phone network, a mobile voice or data network (e.g., a 5G or LTE network), a cable network, a public switched telephone network, or other types of communications networks or combinations of communications networks. The communication paths may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, or firmware components operating together. For example, the computing devices may be implemented by a cloud of computing platforms operating together as the computing devices.

Figure 4:
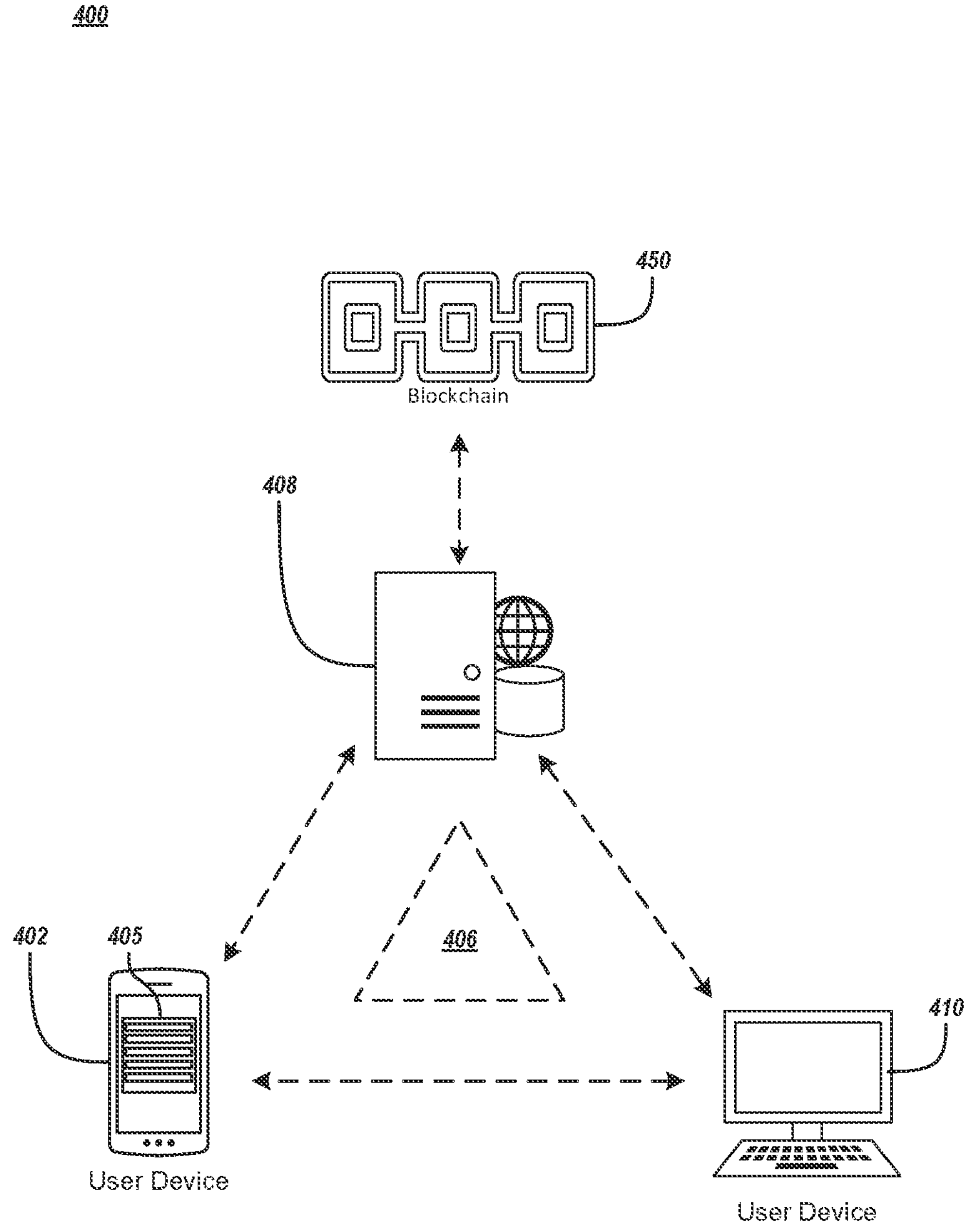
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. A system 400 may include user device 402 and a user device 410. Furthermore, user device 402 may include an application (e.g., application 405) that is implemented on, or accessible by, user device 402. For example, application 405 may interact with one or more other applications or APIs in order to perform multisignature-based network operations. For example, application 405 may include a decentralized application digital wallet or wallet service that is able to sign and send transactions to transfer tokens (e.g., as payment for a data removal request or a verification request) or perform other blockchain operations as well as interact with one or more decentralized applications. Additionally, it should be understood that the user device 410 may perform some or all of the operations described for the user device 402.

System 400 also includes API layer 406. In some embodiments, API layer 406 may be implemented on the user device 402 and the user device 410. Alternatively, or additionally, API layer 406 may reside on one or more of cloud components (e.g., server 408). For example, API layer 406 may reside on a server 408 and include a platform service for a custodial wallet service, decentralized application, etc. API layer 406 (which may be a REST or web services API layer) may provide a decoupled interface to data or functionality of one or more applications. In some embodiments, the API layer 406 may provide various low-level or blockchain-specific operations in order to facilitate multisignature-based network operations. The API layer 406 may also provide informational reads. For example, API layer 406 (or a platform service powered by API layer 406) may generate blockchain operation logs and write to an additional ledger (e.g., an internal record or indexer service) the outcome of the reads. By doing so, a user accessing the information through other means may see consistent information such that downstream users ingest the same data point as the user. Furthermore, in some embodiments, the API layer 406 may provide a unified API to access balances, transaction histories, or other blockchain operations activity records between one or more decentralized applications and custodial user accounts. Some embodiments may require multisignature verification from multiple users to write to a blockchain ledger. For example, some embodiments may obtain verified signed messages and generate an API call that is received by the API layer 406, where the API call causes a transaction and writes a record of the transaction to a blockchain ledger. As described elsewhere, some embodiments may use an instruction precursor to generate both a set of API calls and a set of messages to be sent to users.

The API layer 406 may provide a common, language-agnostic way of interacting with an application. In some embodiments, the API layer 406 may include a web services API that offers a well-defined contract that describes the services in terms of the API's operations and the data types used to exchange information. Alternatively, or additionally, the API layer 406 may include APIs that are documented with client libraries for common languages, such as Ruby, Java, PHP, and JavaScript. Alternatively, or additionally, the API layer 406 may include SOAP web services.

The API layer 406 may use various architectural arrangements. For example, system 400 may be partially based on API layer 406, such that there is strong adoption of SOAP and RESTful web services, using resources like Service Repository and Developer Portal, but with low governance, standardization, and separation of concerns. Alternatively, system 400 may be fully based on API layer 406, such that separation of concerns between layers like API layer 406, services, and applications are in place.

In some embodiments, the system architecture may use a microservice approach to perform one or more operations described in this disclosure. Such systems may use two types of layers: front-end layers and back-end layers, where microservices reside. In this kind of architecture, the role of the API layer 406 may be to provide integration between front end and back end. In such cases, API layer 406 may use RESTful APIs (exposition to front end or even communication between microservices). API layer 406 may use Advanced Message Queuing Protocol (AMQP), which is an open standard for passing business messages between applications or organizations. API layer 406 may use an open source, high performance Remote Procedure Call (RPC) framework that may run in a decentralized application environment. In some embodiments, the system architecture may use an open API approach. In such cases, API layer 406 may use commercial or open source API platforms and their modules. API layer 406 may use a developer portal. API layer 406 may use strong security constraints applying a web application firewall that protects the decentralized applications or API layer 406 against common web exploits, bots, or denial-of-service (DDOS) attacks. API layer 406 may use RESTful APIs as standard for external integration. For example, some embodiments may use the API layer 406 to distribute instructions to perform network operations.

As shown in FIG. 4, system 400 may use API layer 406 to communicate with or facilitate blockchain operations with server 408. For example, server 408 may represent a custodial platform for blockchain operations. For example, a custodial platform may manage private keys stored by a centralized service provider (e.g., server 408). In such cases, server 408 may interact with blockchain 450, a wallet service for blockchain 450, an indexer service for blockchain 450, or other platform services. For example, some embodiments may use a service operating on the server 408 to generate natural language messages for distribution to the user device 402 or receive a signed message from the user device 402. In some embodiments, a wallet service may also provide additional ledger access (e.g., a second ledger). Furthermore, as discussed above, this second ledger may receive updates directly from API layer 406 as opposed to relying on data pulled directly from blockchain 450. For example, system 400 may maintain its records (e.g., both live and for accounting) in good order separate from balances on blockchain 450. That is, system 400 may maintain an architecture featuring the second ledger, where balances are stored and updated, and the logs of blockchain operations.

Figure 5:
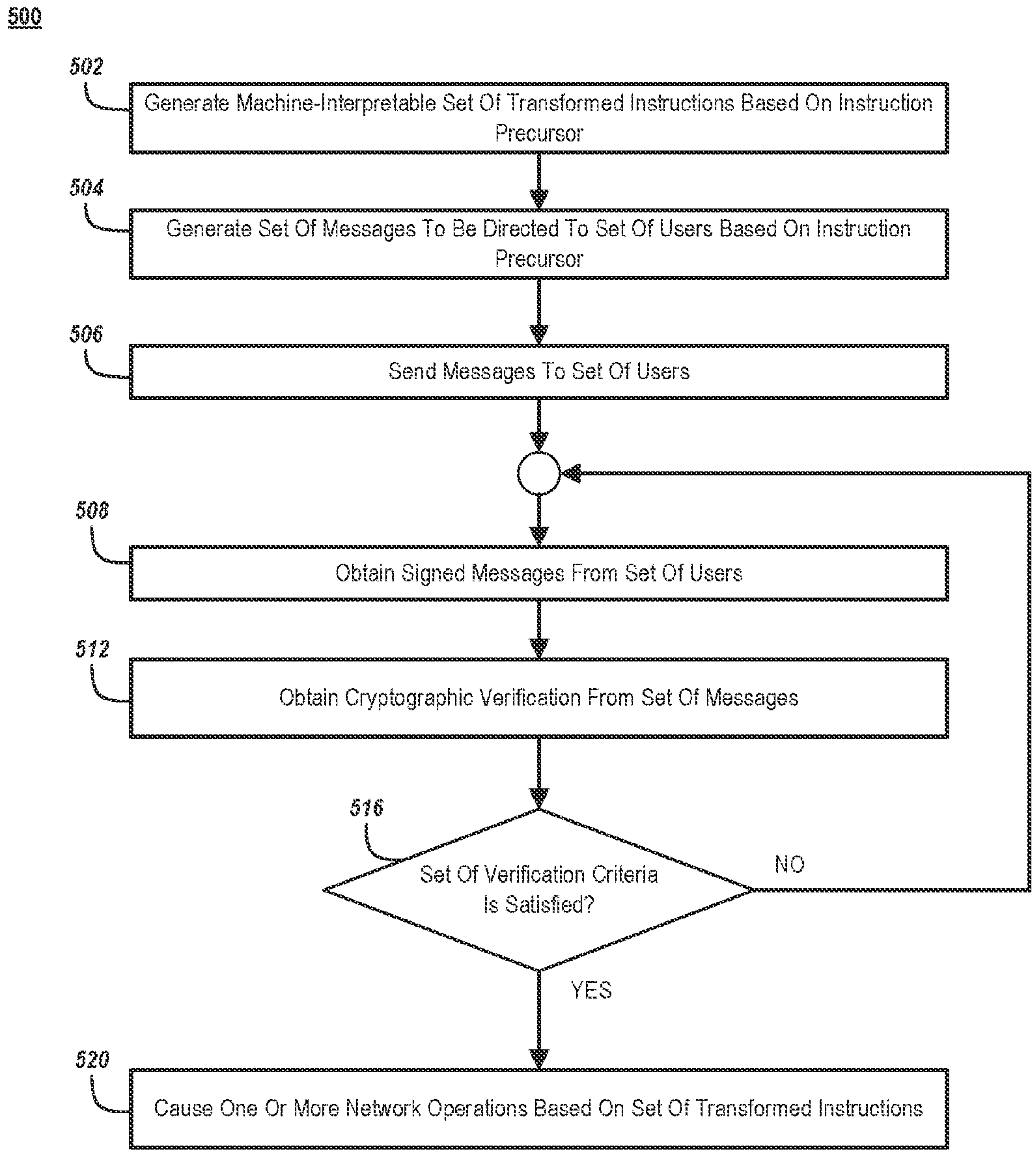
FIG. 5 shows a flowchart of a process for performing network operations based on multiple signed messages, in accordance with one or more embodiments.

FIG. 5 shows a flowchart of a process 500 for performing network operations based on multiple signed messages, in accordance with one or more embodiments. In some embodiments, operations of the process 500 include generating a machine-interpretable set of transformed instructions based on an instruction precursor, as indicated by block 502. Some embodiments may obtain an instruction precursor from a user input, API, or other data source. After obtaining the instruction precursor, some embodiments may provide an instruction transformation model with the instruction precursor to generate one or more machine-interpretable transformed instructions. For example, some embodiments may provide the instruction precursor to the instruction transformation model that includes a data table that associates elements of the instruction precursor to computer-readable program instructions. An instruction precursor may be a file or part of a file that provides instructions for one or more operations that can be then translated into executable instructions, API requests, or other computer-readable instructions. For example, an instruction precursor may include enumerated text written in pseudocode, parameters to identify scripting, and use of a data structure (e.g., a data table, a graph, a key-value pair, etc.) or a machine learning model of the instruction transformation model to generate the computer-readable instructions. Alternatively, or additionally, an instruction precursor may include program instructions or other data directly interpretable by an application.

In some embodiments, operations of the process 500 include generating a set of messages to be directed to a set of users based on the instruction precursor, as indicated by block 504. Some embodiments may use an instruction transformation model to generate a natural language message. In some embodiments, the instruction transformation model used to generate the set of transformed instructions described for block 502 may be different from the instruction transformation model used to generate messages to be directed to the set of users. For example, some embodiments may use a first instruction transformation model to generate a set of scripts interpretable by a distributed application and use a second instruction transformation model to generate natural language text that will then be sent to one or more user devices.

As described elsewhere, some embodiments may generate messages that are sent to users in different languages. For example, some embodiments may obtain a user natural language identifier associated with a first user (e.g., "English," "Mandarin," "Hindi," etc.), where the first user is a target for a natural language message. Some embodiments may then retrieve an instruction transformation model for generating the natural language message, where the instruction transformation model may include a neural machine translation (NMT) system and may include various types of neural networks, such as a sequence-to-sequence model, attention-based model, context-aware model, etc. Some embodiments may then use the instruction transformation model to generate a natural language version of an unexecuted set of instructions. Furthermore, some embodiments may obtain different natural language identifiers for the different users, configure one or more instruction transformation models for each of the different natural language identifiers, and generate a set of messages using the differently configured instruction transformation models based on an instruction precursor.

In some embodiments, a message generated by an instruction transformation model may indicate a set of voting options for a smart contract voting event. For example, some embodiments may generate a natural language message indicating a set of voting options, where some embodiments may then send a first message that includes the natural language message to a first user and send a second message that includes the natural language message to a second user. In some embodiments, the same set of voting options may be presented with different names, punctuation, or image representations based on data associated with a recipient user. As described elsewhere in this disclosure, some embodiments may count the votes provided in a set of signed messages when determining a future network operation to perform.

In some embodiments, operations of the process 500 include sending messages to a set of users, as indicated by block 506. Some embodiments may send a message generated using operations described in block 504 to the set of users. For example, some embodiments may generate the natural language message "Alice will deliver 57 kJ of power to Bob" and send this natural language message to a first user "Alice" and a second user "Bob" via their respective client computing devices. Some embodiments may then send a first request that includes the natural language message to a first user via a first device registered to the first user and send a second request that includes the natural language message to a second user via a second device registered to the second user. Furthermore, some embodiments may store user identifiers, device identifiers, or other identifiers in association with the sent requests for later verification purposes after receiving one or more signed responses from the users.

Some embodiments may send a plurality of natural language messages or other messages to a plurality of users. As described elsewhere, the sent messages do not need to be the same as each other and may even be in different languages. For example, some embodiments may send a first natural language message to a first user and a second natural language message to a second user, where the first natural language may be provided in English and the second natural language may be provided in Spanish. As described elsewhere, both messages may be generated from a same source set of instructions or other type of source. For example, some embodiments may generate different natural language messages from a same API request for a network operation by providing an instruction transformation model with the instructions of the API request and identifiers of the users involved, and a target language to use. Furthermore, while some embodiments may generate natural language messages based on API requests, other embodiments may generate messages from other types of instructions.

In some embodiments, operations of the process 500 include obtaining signed messages from the set of users, as indicated by block 508. In connection with sending an outgoing message to a user, some embodiments may obtain a signed message from that user, where the signed message includes content in the outgoing message. For example, some embodiments may obtain a first signed message from a first user device registered to a first user, where the first signed message includes the text content of a first message sent to the first user. Similarly, some embodiments may obtain a second signed message from a second user device registered to a second user, where the second signed message includes the text content of a second message sent to the second user.

In some embodiments, operations of the process 500 include obtaining a cryptographic verification for the set of signed messages, as indicated by block 512. Some embodiments may perform a cryptographic verification based on an obtained set of signed messages. Alternatively, or additionally, some embodiments may obtain a result indicating that a set of signed messages are cryptographically verified. As described elsewhere, some embodiments may use an airgap device to cryptographically verify a signed message, where the cryptographic verification may come in one of the various forms. For example, the cryptographic verification may be provided as a set of indicators associated with each verified signed message, a signed transaction performed by the cryptographic verification, a specific set of data or smart contract API call, a list of values, a binary value indicating verification or non-verification of an entire set of signed messages, a number indicating a number of verified signed messages, etc. Alternatively, some embodiments may use a node device or another device that is in connection with a decentralized network to cryptographically verify the signed message indicating a network operation of the decentralized network.

In some embodiments, operations of the process 500 include determining whether a set of verification criteria is satisfied, as indicated by block 516. In connection with the cryptographic verification of a set of signed messages, some embodiments may perform operations to determine whether one or more other criteria are satisfied. In some embodiments, the set of criteria may be based on whether a critical number of valid signing parties has provided valid signed messages. For example, some embodiments may determine whether a count of signed messages that have been cryptographically verified satisfies a threshold. The threshold may require that all parties that were sent a signing message actually provide authorization. Alternatively, some embodiments may use a threshold configured to be less than all parties (e.g., a threshold is selected such that only a majority of authorized signing parties is required to have provided a valid signed message).

Alternatively, or additionally, some embodiments may determine whether a set of identifier-related verification criteria are satisfied. For example, some embodiments may obtain a signed message from a device that was sent in response to a sent message. Some embodiments may decrypt a signed message to retrieve a user identifier and determine whether the user identifier satisfies an expected user identifier stored in association with the sent message. Some embodiments may then determine that an identifier-related verification criterion is satisfied based on a determination that the user identifier matches the expected user identifier. Similarly, some embodiments may decrypt a signed message to retrieve a device identifier and determine whether the device identifier matches an expected device identifier stored in association with the sent message. Some embodiments may then determine that the identifier-related verification criterion is satisfied based on a determination that the device identifier matches the expected device identifier. It should be understood that a match between two values can be detected via a direct match or can be detected based on a comparison of hashes or encryption of the two values.

In response to a determination that a set of verification or message content criteria is satisfied, operations of the process 500 may proceed to operations described for block 520. Otherwise, operations of the process 500 may return to block 508 after obtaining one or more additional signed messages.

In some embodiments, operations of the process 500 include causing one or more network operations based on the set of transformed instructions, as indicated by block 520. In connection with the cryptographic verification of the set of signed messages and the satisfaction of a set of verification or message content criteria, some embodiments may effectuate a set of network operations based on a generated transformed instruction. As described elsewhere in this disclosure, the associated set of criteria may include a criterion that a threshold number of valid signatures is satisfied, that a group of generated transformed instructions are the same as each other, etc.

When causing a network operation, some embodiments may send an API call to an appropriate API destination, where the API call being used is an instruction precursor for generating one or more natural language messages. Alternatively, or additionally, the API call may be generated from an instruction precursor. For example, after using an instruction transformation model to generate an API request from a signed message, some embodiments may send the API request to a smart contract API that effectuates a change in a smart contract state or causes the smart contract to update a blockchain. As one such example, some embodiments may receive a set of verified signed messages indicating selected voting options from a set of voting options and count which voting option received the greatest number of votes. Some embodiments may then update a state of a smart contract, a distributed application, or a blockchain ledger by sending an API request indicating the most-voted option. Alternatively, or additionally, some embodiments may perform other network operations, such as broadcasting data to other nodes of a decentralized network, updating data stored in a decentralized network, etc. For example, some embodiments may execute a signed transaction based on the contents of a set of transformed instructions and then broadcast the signed transaction to nodes of a blockchain network to update a blockchain ledger supported by the blockchain network.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, unless stated otherwise, some embodiments may perform some operations described in relations to FIG. 5 without performing all operations described in relations to FIG. 5. Furthermore, it should be noted that any of the component, devices or equipment discussed in relation to the figures above could be used to perform one or more of the steps in FIG. 5.

In some embodiments, the various computers and subsystems illustrated in FIG. 1 may include one or more computing devices that are programmed to perform the functions described herein. The computing devices may include one or more electronic storages (e.g., database(s) 132, which may include distributed database(s) 134, centralized database(s) 136, etc., or other electronic storages), one or more physical processors programmed with one or more computer program instructions, or other components. Some embodiments may store data used by one or more operations described in this disclosure in a database of the set of databases 132. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near-field communication, or other technologies). The computing devices may include a plurality of hardware, software, or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., that is substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-115 or other subsystems. The processors may be programmed to execute computer program instructions by software; hardware; firmware; some combination of software, hardware, or firmware; or other mechanisms for configuring processing capabilities on the processors.

It should be appreciated that the description of the functionality provided by the different subsystems 112-115 described herein is for illustrative purposes and is not intended to be limiting, because any of subsystems 112-115 may provide more or less functionality than is described. For example, one or more of subsystems 112-115 may be eliminated, and some or all of its or their functionality may be provided by other subsystems of subsystems 112-115. As another example, additional subsystems may be programmed to perform some or all of the functionality attributed herein to one of subsystems 112-115.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining a set of signed messages (e.g., one or more signed messages) corresponding to a first set of messages; obtaining a set of transformed instructions based on an instruction precursor; and causing the execution of a network operation based on the cryptographic verification of the set of signed messages.
2. The method of any of the preceding embodiments, wherein causing the execution of the network operation comprise causing the execution of the network operation based on satisfying a threshold number of valid signatures.
3. The method of any of the preceding embodiments, wherein obtaining the set of transformed instructions comprises using a model.
4. A method comprising: generating a set of transformed instructions for a network operation using a first model with an instruction precursor; generating a first message and a second message using a second model based on the instruction precursor; obtaining a first signed message corresponding to the first message via a first user device of a first user and a second signed message corresponding to the second message via a second user device of a second user; and in connection with a cryptographic verification of the first signed message and the second signed message, causing an execution of the network operation using the set of transformed instructions based on the cryptographic verification satisfying a threshold number of valid signatures.
5. A method comprising: generating a set of transformed instructions for a network operation using a first instruction transformation model based on an instruction precursor; generating a natural language message using a second instruction transformation model based on the instruction precursor; sending a first message comprising the natural language message to a first user and a second message comprising the natural language message to a second user; in connection with sending the first message and the second message, obtaining a first signed message comprising the natural language message via a first user device of the first user and a second signed message comprising the natural language message via a second user device of the second user; and in connection with a cryptographic verification of the first signed message and the second signed message indicating that the first signed message is sent by the first user device and that the second signed message is sent by the second user device, causing an execution of the network operation using the set of transformed instructions based on the cryptographic verification satisfying a threshold number of valid signatures.

6. A method comprising: generating instructions for an API request for a network operation by providing a first model with an instruction precursor; generating a natural language message by providing a second model with the instruction precursor; sending a first message comprising the natural language message to a first user and a second message comprising the natural language message to a second user; in connection with sending the first message, obtaining a first key-shard-signed message comprising the natural language message via a first user device of the first user and a second key-shard-signed message comprising the natural language message via a second user device of the second user; and in connection with a cryptographic verification of the first key-shard-signed message and the second key-shard-signed message indicating that the first key-shard-signed message is sent by the first user device and that the second key-shard-signed message is sent by the second user device, executing the network operation using the API request based on the cryptographic verification satisfying a threshold number of valid signatures.

7. The method of any of the preceding embodiments, the operations further comprising: in connection with detecting an event related to the instruction precursor, providing the event to a heuristic model to determine a failure likelihood associated with the event; and sending the failure likelihood to the first user device.

8. The method of any of the preceding embodiments, the operations further comprising providing a first public key associated with the first user to an airgap device that is not connected to a network used to execute the network operation, wherein: the first key-shard-signed message comprises a first digital signature; the cryptographic verification is performed by the airgap device; and the cryptographic verification comprises a verification of the first digital signature based on the first public key.

9. The method of any of the preceding embodiments, wherein using the second model comprises: segmenting, via the first model, the instruction precursor into a sequence of values by using one or more character sequences as delimiters; and generating, via the second model, the natural language message based on the sequence of values.

10. The method of any of the preceding embodiments, further comprising: obtaining a data table mapping one or more segments of the first message to a set of text definitions of the one or more segments; and providing the set of text definitions to the first user device.

11. The method of any of the preceding embodiments, further comprising: detecting a set of events based on the instruction precursor or the natural language message; determining a plurality of likelihoods based on the set of events; and determining a score based on the plurality of likelihoods, wherein sending the first message comprises sending the score to the first user device.

12. The method of any of the preceding embodiments, wherein: a plurality of users comprises the first user and the second user; a plurality of messages comprises the first message and the second message; sending the first message and the second message comprises sending a respective message of the plurality of messages to a respective user of the plurality of users; obtaining the first signed message and the second signed message comprises obtaining a plurality of signed messages, wherein each respective signed message of the plurality of signed messages comprises a respective digital signature of a plurality of digital signatures; and the threshold number of valid signatures is equal to a count of the plurality of users.

13. The method of any of the preceding embodiments, wherein: a plurality of users comprises the first user and the second user; a plurality of messages comprises the first message and the second message; sending the first message and the second message comprises sending a respective message of the plurality of messages to a respective user of the plurality of users; obtaining the first signed message and the second signed message comprises obtaining a plurality of signed messages, wherein each respective signed message of the plurality of signed messages comprises a respective digital signature of a plurality of digital signatures; and the threshold number of valid signatures is less than a count of all of the plurality of users.

14. The method of any of the preceding embodiments, wherein executing the network operation comprises making an API call.

15. The method of any of the preceding embodiments, wherein the cryptographic verification comprises a comparison of a user identifier retrieved from the first signed message and an expected user identifier.

16. The method of any of the preceding embodiments, wherein using the first model comprises selecting the first model based on a decentralized network identifier.

17. The method of any of the preceding embodiments, wherein the first user device is a mobile computing device.

18. The method of any of the preceding embodiments, wherein the first signed message indicates a date of signing.

19. The method of any of the preceding embodiments, the operations further comprising generating a string of options based on a set of voting options of a distributed script, wherein: the first message and the second message comprise the string of options, wherein a portion of the string of options is associated with a first option of the set of voting options; the first signed message and the second signed message comprise an indication of the first option; and causing the execution of the network operation comprises determining a count of votes for the first option indicated based on the first signed message and the second signed message.

20. The method of any of the preceding embodiments, the operations further comprising: detecting a set of numeric values based on the instruction precursor; and determining an extremum of the set of numeric values, wherein sending the first message comprises sending the extremum to the first user device.

21. The method of any of the preceding embodiments, the operations further comprising: detecting an event indicating a numeric value based on the instruction precursor; determining an event type associated with the event; determining a count of events of the event type associated with the first user; and determining a score based on the numeric value and the count of events, wherein sending the first message comprises sending the score to the first user device.

22. The method of any of the preceding embodiments, the operations further comprising: obtaining a first natural language identifier associated with the first user, the first natural language identifier indicating a first language; and configuring the second model based on the first natural language identifier, wherein the first message comprises text written in the first language.

23. The method of any of the preceding embodiments, the operations further comprising: obtaining a second natural language identifier associated with the second user, the second natural language identifier indicating a second language different from the first language; and configuring the second model based on the second natural language identifier, wherein generating the second message comprises using a third model configured with the second natural language identifier, wherein the second message comprises a second natural language message comprising text written in the second language.

24. One or more tangible, non-transitory, machine-readable media storing instructions that, when executed by one or more processes, cause operations comprising those of any of embodiments 1-23.

25. A system comprising: one or more processors; and memory storing instructions that, when executed by the processors, cause the processors to effectuate operations comprising those of any of embodiments 1-23.

26. A system comprising means for performing any of embodiments 1-23.

What is claimed is:

1. A system for executing network operations by verifying keys related to messages, the system comprising:

one or more processors and one or more memory storing instructions that, when executed by the one or more processors, perform operations comprising:

generating, via a first model, based on textual instruction precursor, a set of transformed instructions for a network operation, the set of transformed instructions comprising application programming interface (API) instructions transformed from the textual instruction precursor;

generating, via a second model, based on the textual instruction precursor, a first message and a second message;

in connection with sending the first message to a first user and the second message to a second user, obtaining a first signed message corresponding to the first message via a first user device of the first user and a second signed message corresponding to the second message via a second user device of the second user; and in connection with a cryptographic verification of the first signed message and the second signed message indicating that the first signed message is sent by the first user device and that the second signed message is sent by the second user device, causing an execution of the network operation using the API instructions, transformed from the textual instruction precursor used to generate the first message and the second message, based on the cryptographic verification satisfying a threshold number of valid signatures, wherein the cryptographic verification comprises a comparison of a user identifier retrieved from the first signed message and an expected user identifier, and wherein the cryptographic verification is performed by an airgap device that is not connected to a network used to execute the network operation, and the cryptographic verification comprises a verification of a first digital signature of the first signed message based on a first public key associated with the first user that is provided to the airgap device.

2. The system of claim 1, the operations further comprising:

in connection with detecting an event related to the textual instruction precursor, providing the event to a heuristic model to determine a failure likelihood associated with the event; and sending the failure likelihood to the first user device.

3. A method comprising:

generating, via a first model, based on an instruction precursor, a set of transformed instructions for a network operation;

generating, via a second model, based on the instruction precursor, a first message and a second message;

sending the first message to a first user and the second message to a second user;

in connection with sending the first message to the first user and the second message to the second user, obtaining a first signed message corresponding to the first message via a first user device of the first user and a second signed message corresponding to the second message via a second user device of the second user, wherein the first signed message comprises a first digital signature;

providing a first public key associated with the first user to an airgap device that is not connected to a network used to execute the network operation; and in connection with a cryptographic verification of the first signed message and the second signed message indicating that the first signed message is sent by the first user device and that the second signed message is sent by the second user device, causing an execution of the network operation using the set of transformed instructions, generated using the instruction precursor used to generate the first message and the second message, based on the cryptographic verification satisfying a threshold number of valid signatures, wherein the cryptographic verification is performed by the airgap device, and the cryptographic verification comprises a verification of the first digital signature based on the first public key.

4. The method of claim 3, wherein generating the first message and the second message comprises:

segmenting, via the first model, the instruction precursor into a sequence of values by using one or more character sequences as delimiters; and generating, via the second model, based on the sequence of values, a natural language message that is included in both the first message and the second message.

5. The method of claim 3, further comprising:

obtaining a data table mapping one or more segments of the first message to a set of text definitions of the one or more segments; and providing the set of text definitions to the first user device.

6. The method of claim 3, further comprising:

detecting a set of events based on the instruction precursor or a natural language message that is included in both the first message and the second message;

determining a plurality of likelihoods based on the set of events; and determining a score based on the plurality of likelihoods, wherein sending the first message comprises sending the score to the first user device.

7. The method of claim 3, wherein:

a plurality of users comprises the first user and the second user;

a plurality of messages comprises the first message and the second message; sending the first message and the second message comprises sending a respective message of the plurality of messages to a respective user of the plurality of users;

obtaining the first signed message and the second signed message comprises obtaining a plurality of signed messages, wherein each respective signed message of the plurality of signed messages comprises a respective digital signature of a plurality of digital signatures; and the threshold number of valid signatures is equal to a count of the plurality of users.

8. The method of claim 3, wherein:

a plurality of users comprises the first user and the second user;

a plurality of messages comprises the first message and the second message; sending the first message and the second message comprises sending a respective message of the plurality of messages to a respective user of the plurality of users;

obtaining the first signed message and the second signed message comprises obtaining a plurality of signed messages, wherein each respective signed message of the plurality of signed messages comprises a respective digital signature of a plurality of digital signatures; and the threshold number of valid signatures is less than a count of all of the plurality of users.

9. The method of claim 3, wherein executing the network operation comprises making an API call.

10. The method of claim 3, wherein the cryptographic verification comprises a comparison of a user identifier retrieved from the first signed message and an expected user identifier.

11. The method of claim 3, wherein using the first model comprises selecting the first model based on a decentralized network identifier.

12. One or more non-transitory computer-readable media storing instructions that, when executed by one or more processors, cause operations comprising:

generating, via a first model, based on an instruction precursor, a set of transformed instructions for a network operation;

generating, via a second model, based on the instruction precursor, a first message and a second message, wherein the first message and the second message comprise a string of options that includes a portion associated with a first option of a set of voting options of a distributed script;

in connection with sending the first message to a first user and the second message to a second user, obtaining a first signed message corresponding to the first message via a first user device of the first user and a second signed message corresponding to the second message via a second user device of the second user, wherein the first signed message and the second signed message comprise an indication of the first option; and in connection with a cryptographic verification of the first signed message and the second signed message indicating that the first signed message is sent by the first user device and that the second signed message is sent by the second user device, causing an execution of the network operation using the set of transformed instructions based on (i) the cryptographic verification satisfying a threshold number of valid signatures and (ii) a count of votes for the first option indicated by the first signed message and the second signed message, wherein the cryptographic verification comprises a comparison of a user identifier retrieved from the first signed message and an expected user identifier.

13. The one or more non-transitory computer-readable media of claim 12, wherein the first user device is a mobile computing device.

14. The one or more non-transitory computer-readable media of claim 12, wherein the first signed message indicates a date of signing.

15. The one or more non-transitory computer-readable media of claim 12, the operations further comprising generating the string of options based on the set of voting options of the distributed script.

16. The one or more non-transitory computer-readable media of claim 12, the operations further comprising:

detecting a set of numeric values based on the instruction precursor; and determining an extremum of the set of numeric values, wherein sending the first message comprises sending the extremum to the first user device.

17. The one or more non-transitory computer-readable media of claim 12, the operations further comprising:

detecting an event indicating a numeric value based on the instruction precursor; determining an event type associated with the event;

determining a count of events of the event type associated with the first user; and determining a score based on the numeric value and the count of events, wherein sending the first message comprises sending the score to the first user device.

18. The one or more non-transitory computer-readable media of claim 12, the operations further comprising:

obtaining a first natural language identifier associated with the first user, the first natural language identifier indicating a first language; and configuring the second model based on the first natural language identifier, wherein the first message comprises text written in the first language.

19. The one or more non-transitory computer-readable media of claim 18, the operations further comprising:

obtaining a second natural language identifier associated with the second user, the second natural language identifier indicating a second language different from the first language; and configuring the second model based on the second natural language identifier, wherein generating the second message comprises using a third model configured with the second natural language identifier, wherein the second message comprises a second natural language message comprising text written in the second language.

* * * * *